United States Patent
Altman

(10) Patent No.: US 9,641,444 B2
(45) Date of Patent: May 2, 2017

(54) SYSTEM AND METHOD FOR EXTRACTING USER IDENTIFIERS OVER ENCRYPTED COMMUNICATION TRAFFIC

(71) Applicant: Verint Systems Ltd., Herzliya Pituach (IL)

(72) Inventor: Yuval Altman, Herzliya (IL)

(73) Assignee: VERINT SYSTEMS LTD., Herzelia, Pituach (IL)

( * ) Notice: Subject to any disclaimer, the term of this patent is extended or adjusted under 35 U.S.C. 154(b) by 141 days.

(21) Appl. No.: 14/604,144

(22) Filed: Jan. 23, 2015

(65) Prior Publication Data

US 2015/0215221 A1 Jul. 30, 2015

(30) Foreign Application Priority Data

Jan. 30, 2014 (IL) .......................................... 230742

(51) Int. Cl.
*H04L 12/26* (2006.01)
*H04L 12/851* (2013.01)
*H04L 29/06* (2006.01)
*H04L 12/859* (2013.01)

(52) U.S. Cl.
CPC .......... *H04L 47/2483* (2013.01); *H04L 43/10* (2013.01); *H04L 43/106* (2013.01); *H04L 63/306* (2013.01); *H04L 47/2475* (2013.01); *H04L 63/0428* (2013.01)

(58) Field of Classification Search
None
See application file for complete search history.

(56) References Cited

U.S. PATENT DOCUMENTS

| | | | |
|---|---|---|---|
| 5,689,442 A | 11/1997 | Swanson et al. | |
| 6,404,857 B1 | 6/2002 | Blair et al. | |
| 6,718,023 B1 | 4/2004 | Zolotov | |
| 6,757,361 B2 | 6/2004 | Blair et al. | |
| 7,216,162 B2 | 5/2007 | Amit et al. | |
| 7,466,816 B2 | 12/2008 | Blair | |
| RE40,634 E | 2/2009 | Blair et al. | |
| 7,587,041 B2 | 9/2009 | Blair | |
| 7,979,457 B1 * | 7/2011 | Garman | G06F 17/30864 705/26.8 |
| 8,789,181 B2 * | 7/2014 | Blackwell | G06F 21/554 726/22 |
| 9,258,313 B1 * | 2/2016 | Knappe | H04L 63/12 |

(Continued)

OTHER PUBLICATIONS

Altshuler, Y., et al., "How Many Makes a Crowd? On the Evolution of Learning as a Factor of Community Coverage," LNCS 7227, 2012, pp. 43-52.

(Continued)

*Primary Examiner* — Michael J Moore, Jr.
(74) *Attorney, Agent, or Firm* — Meunier Carlin & Curfman

(57) ABSTRACT

Systems and methods for extracting user identifiers over encrypted communication traffic are provided herein. An example method includes monitoring multiple flows of communication traffic. A sequence of messages is then sent to a user in accordance with a first temporal pattern. A flow whose activity has a second temporal pattern that matches the first pattern is then identified among the monitored flows. The identified flow is then associated with the user.

20 Claims, 2 Drawing Sheets

(56) References Cited

U.S. PATENT DOCUMENTS

| | | | |
|---|---|---|---|
| 9,479,522 B1* | 10/2016 | Cirkovic | H04L 63/1416 |
| 2007/0271371 A1* | 11/2007 | Singh Ahuja | H04L 43/18 709/224 |
| 2008/0014873 A1 | 1/2008 | Krayer et al. | |
| 2008/0261192 A1 | 10/2008 | Huang et al. | |
| 2008/0285464 A1 | 11/2008 | Katzir | |
| 2008/0295173 A1* | 11/2008 | Tsvetanov | H04L 63/1425 726/23 |
| 2011/0238855 A1* | 9/2011 | Korsunsky | G06F 21/55 709/231 |
| 2011/0302251 A1* | 12/2011 | Meunier | G06F 15/16 709/206 |
| 2012/0151046 A1* | 6/2012 | Weiss | G06F 21/604 709/224 |
| 2012/0240185 A1* | 9/2012 | Kapoor | H04L 63/1425 726/1 |
| 2012/0297051 A1* | 11/2012 | Kakadia | H04L 43/026 709/224 |
| 2013/0166657 A1* | 6/2013 | Tadayon | H04M 1/72552 709/206 |
| 2013/0290436 A1* | 10/2013 | Martin | G06Q 10/107 709/206 |
| 2014/0059216 A1* | 2/2014 | Jerrim | H04L 67/104 709/224 |
| 2014/0281030 A1* | 9/2014 | Cui | H04L 43/026 709/244 |
| 2015/0100356 A1* | 4/2015 | Bessler | G06Q 10/0631 705/7.12 |

OTHER PUBLICATIONS

Altshuler, Y., et al., Incremental Learning with Accuracy Prediction of Social and Individual Properties from Mobile-Phone Data, 2011, IEEE, 10 pages.
Aho, Alfred V., et al., "Efficient String Matching: An Aid to Bibliographic Search," Communication of the ACM, Jun. 1975, vol. 18, No. 6, pp. 333-340.
Altshuler, Y., et al., "Trade-Offs in Social and Behavioral Modeling in Mobile Networks," LNCS 7812, 2013, pp. 412-423.
Argamon, S., et al., "Automatically Profiling the Author of an Anonymous Text," Communication of the ACM, vol. 52, No. 2, Feb. 2009, pp. 119-123.
Argamon, S., et al., "Gender, Genre, and Writing Style in Formal Written Texts," Text & Talk, vol. 23, Issue 3, 2003, 32 pages.
Atkinson, M., et al., "Near Real Time Information Mining in Multilingual News," World Wide Web Conference, Apr. 20-24, 2009, 2 pages.
Cloudshield, Inc., "Lawful Intercept Next-Generation Platform," 2009, 6 pages.
Coffman, T., et al., "Graph-Based Technologies for Intelligence Analysis," CACM, Mar. 2004, 12 pages.
Corney, M., et al. "Gender-Preferential Text Mining of E-mail Discourse," Proceedings of the 18the Annual Computer Security Applications Conference, 2002, 8 pages.
Dharmapurikar, Sarang, et al., "Fast and Scalable Pattern Matching for Network Intrusion Detection Systems," IEEE Journal on Selected Areas in Communications, Oct. 2006, vol. 24, Issue 10, pp. 1781-1792.
De Vel, O., et al., "Language and Gender Author Cohort Analysis of E-mail for Computer Forensics," Defence Science and Technology Organisation, Australia, 2002, 16 pages.
Eagle, N., et al., "Inferring friendship network structure by using mobile phone data," PNAS, vol. 106, No. 36, 2009, pp. 15274-15278.
Estival, D., et al., "Author Profiling for English Emails," Proceedings of the 10th Conference of the Pacific Association for Computational Linguistics, 2007, pp. 263-272.
Fisk, Mike, et al., "Applying Fast String Matching to Intrusion Detection," Los Alamos National Laboratory and University of California San Diego, Jun. 1975, 22 pages.

FoxReplay Analyst, Fox Replay BV, http//www.foxreplay.com, Revision 1.0, Nov. 2007, 5 pages.
FoxReplay Analyst Product Brochure, Fox-IT BV, http//www.foxreplay.com, 2006, 2 pages.
Goldfarb, Eithan, "Mass Link Analysis: Conceptual Analysis," Jun. 24, 2007, Version 1.1, 21 pages.
Goswami, S., et al., "Stylometric Analysis of Bloggers' Age and Gender," Proceedings of the Third International ICWSM Conference, 2009, pp. 214-217.
Lakhina, A., et al., "Mining Anomalies Using Traffic Feature Distributions," SIGCOMM, 2005, pp. 217-228.
Mohrehkesh, S., et al., "Demographic Prediction of Mobile User from Phone Usage," Proceedings Mobile Data Challenge by Nokia Workshop, Newcastle, United Kingdom, 2012, 4 pages.
Navarro, Gonzalo, et al., "Flexible Pattern Matching in Strings: Practical On-Line Search Algorithms for Texts and Biological Sequences," Cambridge University Press, 2002, 166 pages.
Netronome SSL Inspector Solution Overview White Paper, "Examining SSL-encrypted Communications," 2010, 8 pages.
Pan, Long, "Effective and Efficient Methodologies for Social Network Analysis," Dissertation submitted to faculty of Virginia Polytechnic Institute and State University, Blacksburg, Virginia, Dec. 11, 2007, 148 pages.
Rangel, F., et al., "Overview of the Author Profiling Task at PAN 2013," CLEF 2013 Evaluation Labs, 2013, 13 pages.
Rohde & Schwarz GmbH & Co. KG, "ACCESSNET-T, DMX-500 R2, Digital Mobile eXchange," Product Brochure, Secure Communications, Mar. 2000, 4 pages.
Rohde & Schwarz GmbH & Co. KG, "ACCESSNET-T IP," Product Brochure, Secure Communications, Jan. 2000, 4 pages.
Rohde & Schwarz GmbH & Co. KG, "R&S AllAudio Integrated Digital Audio Software," Product Brochure, Radiomonitoring & Radiolocation, Feb. 2000, 12 pages.
Rohde & Schwarz GmbH & Co. KG, "R&S AllAudio Integrierte digitale Audio-Software," Product Brochure, Feb. 2002, 12 pages.
Rohde & Schwarz GmbH & Co. KG, "R&S AMMOS GX425 Software," http://www2.rohde-schwarz.com/en/products/radiomonitoring/Signal_Analysis/GX425, Jul. 30, 2010, 1 page.
Rohde & Schwarz GmbH & Co. KG, "R&S AMOS GX430 PC-Based Signal Analysis and Signal Processing Standalone software solution," http://www2.rohde-schwarz.com/en/products/radiomonitoring/Signal_Analysis/GX430, Jul. 30, 2010, 1 page.
Rohde & Schwarz GmbH & Co. KG, "Digital Standards for R&S SMU200A, R&S SMATE200A, R&S SMJ100A, R&S SMBV100A and R&S AMU200A," Data Sheet, Test & Measurement, May 2000, 68 pages.
Rohde & Schwarz GmbH & Co. KG, "Integrated Digital Audio Software R&S AllAudio," Specifications, 2000, 8 pages.
Rohde & Schwarz GmbH & Co. KG, "R&S RA-CM Continuous Monitoring Software," Product Brochure, Radiomonitoring & Radiolocation, Jan. 2001, 16 pages.
Rohde & Schwarz GmbH & Co. KG, "R&S RAMON COMINT/CESM Software," Product Brochure, Radiomonitoring & Radiolocation, Jan. 2000, 22 pages.
Rohde & Schwarz GmbH & Co. KG, "R&S TMSR200 Lightweight Interception and Direction Finding System," Technical Information, Aug. 14, 2009, 8SPM-ko/hn, Version 3.0, 10 pages.
Schulzrinne, H., et al., "RTP: A Transport Protocol for Real-Time Applications," Standards Track, Jul. 2003, 89 pages.
Sheng, Lei, et al., "A Graph Query Language and Its Query Processing," IEEE, Apr. 1999, pp. 572-581.
Soghoian, Christopher, et al., "Certified Lies: Detecting and Defeating Government Interception Attacks Against SSL," 2010, 19 pages.
Stamatatos, E., "Author identification: Using text sampling to handle the class imbalance problem," Science Direct, Information Processing and Management, vol. 44, 2008, pp. 790-799.
Svenson, Pontus, et al., "Social network analysis and information fusion for anti-terrorism," CIMI, 2006, 8 pages.
Tongaonkar, Alok S., "Fast Pattern-Matching Techniques for Packet Filtering," Stony Brook University, May 2004, 44 pages.
Verint Systems Inc., "Mass Link Analysis: Solution Description," Dec. 2008, 16 pages.

(56) References Cited

OTHER PUBLICATIONS

Yu, Fang, et al., "Fast and Memory-Efficient Regular Expression Matching for Deep Packet Inspection," ANCS'06, San Jose, California, Dec. 3-5, 2006, 10 pages.

Yu, Fang, et al., "Gigabit Rate Packet Pattern-Matching Using TCAM," Proceedings of the 12th IEEE International Conference on Network Protocols (ICNP'04), 2004, 10 pages.

\* cited by examiner

SYSTEM AND METHOD FOR EXTRACTING USER IDENTIFIERS OVER ENCRYPTED COMMUNICATION TRAFFIC

FIELD OF THE DISCLOSURE

The present disclosure relates generally to communication analysis, and particularly to methods and systems for extracting identifiers from encrypted traffic.

BACKGROUND OF THE DISCLOSURE

Communication terminals and their users are identified in communication networks using various kinds of communication identifiers. Extraction and tracking of communication identifiers are an important tool in many applications, such as in on-line advertizing, network management, network performance monitoring, testing of network security, as well as law enforcement applications.

SUMMARY OF THE DISCLOSURE

An embodiment that is described herein provides a method including monitoring multiple flows of communication traffic. A sequence of messages is sent to a user in accordance with a first temporal pattern. A flow whose activity has a second temporal pattern that matches the first temporal pattern is identified among the monitored flows. The identified flow is associated with the user.

In some embodiments, identifying the flow includes predicting a third temporal pattern with which the sequence of the messages is expected to reach the user, and comparing the second and third temporal patterns. In an embodiment, the monitored flows are encrypted. In some embodiments, associating the identified flow with the user includes extracting from the identified flow a communication identifier of a communication terminal operated by the user. In an embodiment, the method includes tracking the user using the extracted communication identifier.

In another embodiment, sending the messages includes communicating with the user using a given communication application, and monitoring the flows includes choosing to monitor the flows of the given communication application. In yet another embodiment, sending the messages includes configuring the messages such that the messages will not be presented to the user.

In still another embodiment, identifying the flow includes matching traffic arrival times in the flow with respective traffic transmission times in the sequence of the messages. In a disclosed embodiment, identifying the flow includes matching traffic volume as a function of time in the flow and in the sequence of the messages. In another embodiment, identifying the flow includes progressively narrowing down a list of candidate flows that match the sequence of the messages, so as to converge to the identified flow.

There is additionally provided, in accordance with an embodiment that is described herein, apparatus including an interface and a processor. The interface is configured for communicating over a communication network. The processor is configured to monitor multiple flows of communication traffic in the communication network, to send to a user a sequence of messages in accordance with a first temporal pattern, to identify among the monitored flows a flow whose activity has a second temporal pattern that matches the first temporal pattern, and to associate the identified flow with the user.

The present disclosure will be more fully understood from the following detailed description of the embodiments thereof, taken together with the drawings in which:

DETAILED DESCRIPTION OF EMBODIMENTS

Overview

Embodiments that are described herein provide improved methods and systems for associating communication traffic with network users of interest. The disclosed techniques are able to perform this association even when the traffic content is not decodable, e.g., due to encryption. In the present context, the term "decodable" means that text, content and/or metadata can be extracted from the traffic in human-readable form. Once certain traffic is associated with a user, the association can be used, for example, for identifying and tracking the communication terminal (e.g., mobile phone or computing device) operated by the user.

In some embodiments, a communication analysis system monitors multiple traffic flows. In some practical cases, a layer-7 identifier of a network user of interest is known, e.g., the user's e-mail address or Skype ID. The application that uses this Layer-7 identifier, however, encrypts the traffic or otherwise makes it un-decodable. For various reasons it is desirable to identify the current 5-tuple (source IP, source port, destination IP, destination port, protocol) used by the application, or at least parts of the 5-tuple such as the user's IP address.

The 5-tuple is useful, for example, for monitoring the traffic of the user of interest, including parts which may be non-encrypted or otherwise decodable, using the user's current IP address. Another possible use is to track the user's geographical location using the identified IP address. The user's IP address may not be known to the system, for example it is assigned dynamically or because the user may operate behind a Network Address Translation (NAT) device.

In order to identify which flow is associated with the user of interest, the system proactively causes a sequence of messages having a predictable temporal pattern to be sent to the user (e.g., to a known e-mail address or Skype ID). The system attempts to identify, among the multiple monitored flows, one or more flows having a temporal pattern that matches the temporal pattern of the message sequence sent to the user. If such a flow is found, the system associates this flow with the user.

The disclosed association process is based on matching temporal activity patterns of traffic flows (e.g., arrival times of messages, gaps between messages, message lengths or generally traffic volume as a function of time), and does not involve decoding the actual content of the traffic flows. As such, the disclosed techniques are suitable for analyzing traffic that is un-decodable, due to encryption or for any other reason.

In an example embodiment, once a flow is found to be associated with the user, the system extracts from this flow a communication identifier (e.g., IP or MAC address or the full 5-tuple) of a communication terminal of the user. The extracted identifier can be used for subsequent tracking and monitoring of the user or his traffic.

System Description

Figure 1:
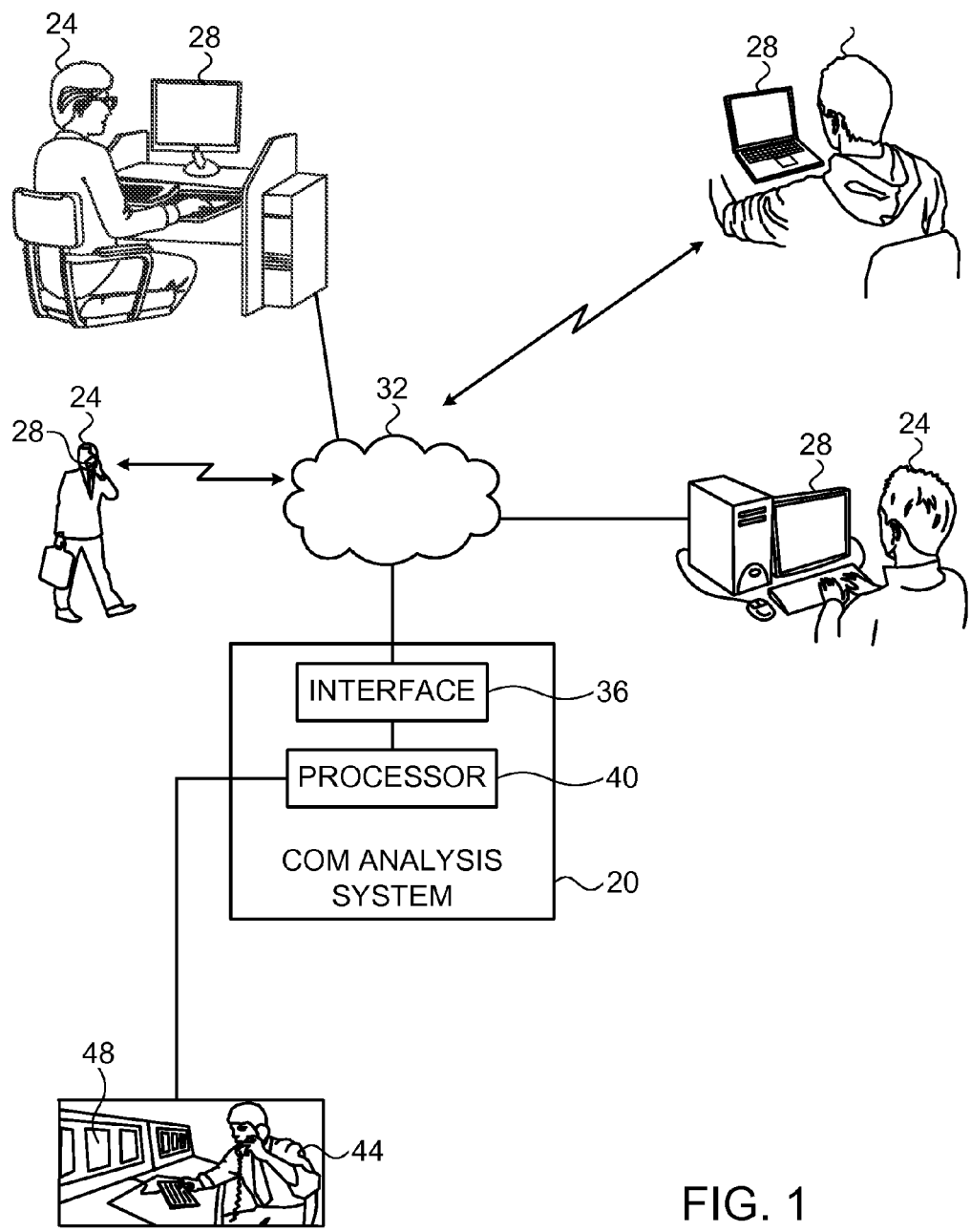
FIG. 1 is a block diagram that schematically illustrates a communication analysis system, in accordance with an embodiment that is described herein.

FIG. 1 is a block diagram that schematically illustrates a communication analysis system 20, in accordance with an embodiment that is described herein. System 20 monitors and analyzes communication traffic of users 24 that communicate over a communication network 32 using communication terminals 28. A system of this sort may be used, for example, for on-line advertizing, network management, network performance monitoring, "pen testing" of network security, or to carry out Lawful Interception (LI) of users.

Network 32 may comprise any suitable communication network, such as the Internet or other Wide Area Network (WAN), a Local Area Network (LAN), or any other suitable wireline or wireless network. Terminals 28 may comprise, for example, personal or mobile computers, mobile phones, Personal Digital Assistants (PDAs), or any other suitable platform having communication capabilities.

In the present example, system 20 comprises an interface 36 for connecting to network 32, and a processor 40 that is configured to carry out the methods described herein. Among other tasks, processor 40 monitors multiple traffic flows in network 32 and identifies flows that are associated with users, as will be explained in detail below. System 20 is operated by an operator 44 (e.g., an analyst) using an operator terminal 48.

The configuration of system 20 shown in FIG. 1 is an example configuration, which is chosen purely for the sake of conceptual clarity. In alternative embodiments, any other suitable system configuration can be used. Some elements of system 20 may be implemented in hardware, e.g., in one or more Application-Specific Integrated Circuits (ASICs), Field-Programmable Gate Arrays (FPGAs) or network processors. Additionally or alternatively, some elements of system 20 can be implemented using software, or using a combination of hardware and software elements.

Some of the functions of system 20, such as the functions of processor 40, may be carried out using a general-purpose processor (e.g., server), which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

Association Between Traffic Flows and Users Based on Matching of Temporal Activity Patterns In some practical scenarios, it is desirable to identify traffic that is associated with a certain user of interest, even though it is not possible to decode and analyze the traffic content. For example, the user may communicate using an encrypted communication protocol such as HTTPS. In some embodiments, system 20 first correlates the user's application-layer identity (e.g., e-mail address) with his network-level identity (e.g., IP or MAC address), and then uses the network-level identity to collect and act upon traffic of the user. Parts of the collected traffic may be decodable and other parts may be un-decodable, but the system typically collects both types of traffic.

In some embodiments, system 20 finds such a correlation based on the temporal activity patterns of traffic flows rather than based on content. In the disclosed embodiments, the system proactively causes a sequence of messages with a known temporal pattern to be sent to the user, and looks for a monitored traffic flow that exhibits a similar temporal pattern.

Consider, for example, a user who is known to be using some e-mail application (e.g., Gmail), and assume that the user's e-mail address is known. In many practical cases, layer-7 identifiers such as e-mail addresses are encrypted along with the traffic content, and therefore cannot be decoded for identifying the user. In such embodiments, processor 40 of system 20 may send a sequence of e-mail messages, which are ultimately forwarded to the known e-mail address with a predictable temporal pattern. Processor 40 may send, for example, a message every three minutes, at varying but predictable intervals, or using any other suitable temporal pattern.

In many practical circumstances, the temporal pattern of the messages sent by system 20 is not exactly the same as the temporal pattern of the messages reaching the user. For example, when sending a sequence of e-mail messages to the user's e-mail address, the messages are processed by intermediate nodes such as e-mail servers. As a result, the temporal pattern of the messages reaching the user's terminal may differ from that of the messages sent by system 20. Nevertheless, the temporal pattern of the messages reaching the user's terminal can be predicted from the nature of the original message sequence.

Moreover, since in many cases the traffic is encrypted, it is impossible to identify its content but possible to predict the traffic characteristics (e.g., the number of messages, length of messages, timing, and in some cases also the source of the messages).

Thus, in the context of the present patent application and in the claims, phrases such as "sending a sequence of messages having a known temporal pattern" means performing any suitable actions that eventually cause a sequence of messages having a predictable temporal pattern to be sent.

In parallel, system 20 monitors multiple traffic flows in network 32. The system may monitor flows at any suitable location or interface in network 32, for example the flows of an entire country or city, the flows of a specific enterprise or location (e.g., Internet café), or any other suitable collection of flows that are likely to contain the traffic associated with the user. As noted above, in some cases the monitored traffic underwent Network Address Translation (NAT).

From among the monitored flows, processor 40 attempts to find one or more flows whose temporal activity pattern matches the temporal pattern of the message sequence sent to the user. Matching the temporal patterns may involve matching properties such as:
  Message times—Comparing message transmission times from system 20 against message occurrence times in the monitored flows.
  Time gaps between messages.
  Message lengths.
  General traffic volume as a function of time.

As noted above, in some embodiments the comparison between the temporal patterns of the sent messages and the monitored flows is not a one-to-one comparison. Typically, processor 40 is able to predict the temporal pattern of the messages that ultimately reach the user as a result of the actions taken by system 20, and use this predicted pattern for comparison. Additionally or alternatively, any other suitable temporal activity properties can be used for comparing the message sequence sent to the user with the monitored flows.

When performing the above matching, processor 40 typically takes into account the statistical nature of possible matches. For example, the user may send or receive other messages, in addition to the message sequence sent from system 20. As another example, the time delays in network 32 are not entirely fixed or predictable, and therefore time gaps between messages may fluctuate. Typically, the matching process performed by processor 40 allows for imperfect matches, for example due to the above reasons.

The matching process may use any suitable distance metric to decide whether a flow matches the sequence of sent messages. One example metric is the Levinstein distance, to determine that two sequences of message lengths are similar. In some embodiments processor 40 compares the distance to a threshold in order to decide on a match.

In some embodiments, processor 40 carries out an iterative matching process that gradually converges to a single matching flow (or to a small number of matching flows). In an example embodiment, processor 40 initially identifies a list of candidate flows that match the temporal pattern of the message sequence. Processor 40 then gradually narrows down the list, so as to try and converge to a single matching flow. The list may be narrowed down over time, for example, in response to additional messages sent in the sequence.

When performing such an iterative convergence process, there is a tradeoff between the threshold and the number of iterations. The trade-off parameter may be adjusted automatically based on user feedback on success—False positives would typically require more iterations. The iterative convergence process described above may be applied differently depending on the scale and number of monitored flows. When initially monitoring only a small number of flows, it may be possible to rely on the inherent smaller probability of false detection, due to the small number of monitored flows. It may also be possible to use additional external parameters or identifiers, such as device MAC Address, for deciding on a match.

The example above refers to an e-mail application. The disclosed techniques, however, are not limited to e-mail and can be used with various other applications. For example, if the Skype ID of the user is known, system 20 may send the user a sequence of Skype messages, and perform a similar matching process. Other suitable applications that can be used for this purpose are, for example, Instant Messaging (IM) applications, chat applications in social networks. In some of the applications the traffic goes through a server en-route to the user. Other applications have a peer-to-peer structure.

In some embodiments, system 20 sends the user two or more sequences of messages using two or more different applications (e.g., both Gmail and Skype). In these embodiments, the system performs temporal pattern matching for the two types of flows, thereby increasing the confidence level of the correlation. For example, if the same identifier (e.g., IP address) is extracted from a Gmail flow and a Skype flow, the correlation can be regarded as highly reliable.

In some embodiments, system 20 monitors only flows of the same application that is used for sending the sequence of messages to the user. For example, if system 20 sends the messages using a given e-mail application, the system may choose to monitor flows of this e-mail application rather than all flows. This feature enables the system to reduce the number of monitored flows considerably.

In some embodiments, processor 40 configures the messages in the sequence such that the messages will not be presented to the user, at least with high probability. As a result, the process remains transparent to the user. In some embodiments, the messages are designed to reach the browser of the user but to be blocked, discarded or diverted by the browser.

For example, processor 40 may configure the messages in the sequence such that the messages will be diverted to a spam folder. Messages that are likely to be regarded as spam comprise, for example, social network contact ("friendship") requests or advertisements. As another example, the messages may be configured to have a size that exceeds the maximum message size permitted in the user's inbox. Such messages may be discarded.

As yet another example, processor 40 may take advantage of some vulnerability or feature of the application in question, for example if it is known that the application silently discards messages of a certain configuration. One example of this sort is repeated requests for friendship.

Upon successfully finding a matching flow, processor 40 may take various actions. In an example embodiment, processor 40 extracts from the flow a communication identifier of the communication terminal 28 (e.g., mobile phone or computer) used by the user. The communication identifier may comprise, for example, an Internet Protocol (IP) address, a Medium Access Control (MAC) address, a Transmission Control Protocol (TCP) connection 5-tuple, or any other suitable identifier. The extracted identifier can then be used, by system 20 or otherwise, for tracking the terminal 28 of the user. In some embodiments, processor 40 reports the match to operator 44 using operator terminal 48.

In some embodiments, processor 40 decides whether to try and identify the full 5-tuple or a subset of the 5-tuple, e.g., only the IP address. The decision may depend, for example, on whether the flow or flows in question serve a single individual or multiple individuals, a single computer or multiple computers. Example techniques for deducing such information are described in U.S. patent application Ser. No. 13/283,532, filed Oct. 27, 2011, which is assigned to the assignee of the present patent application and whose disclosure is incorporated herein by reference.

Figure 2:
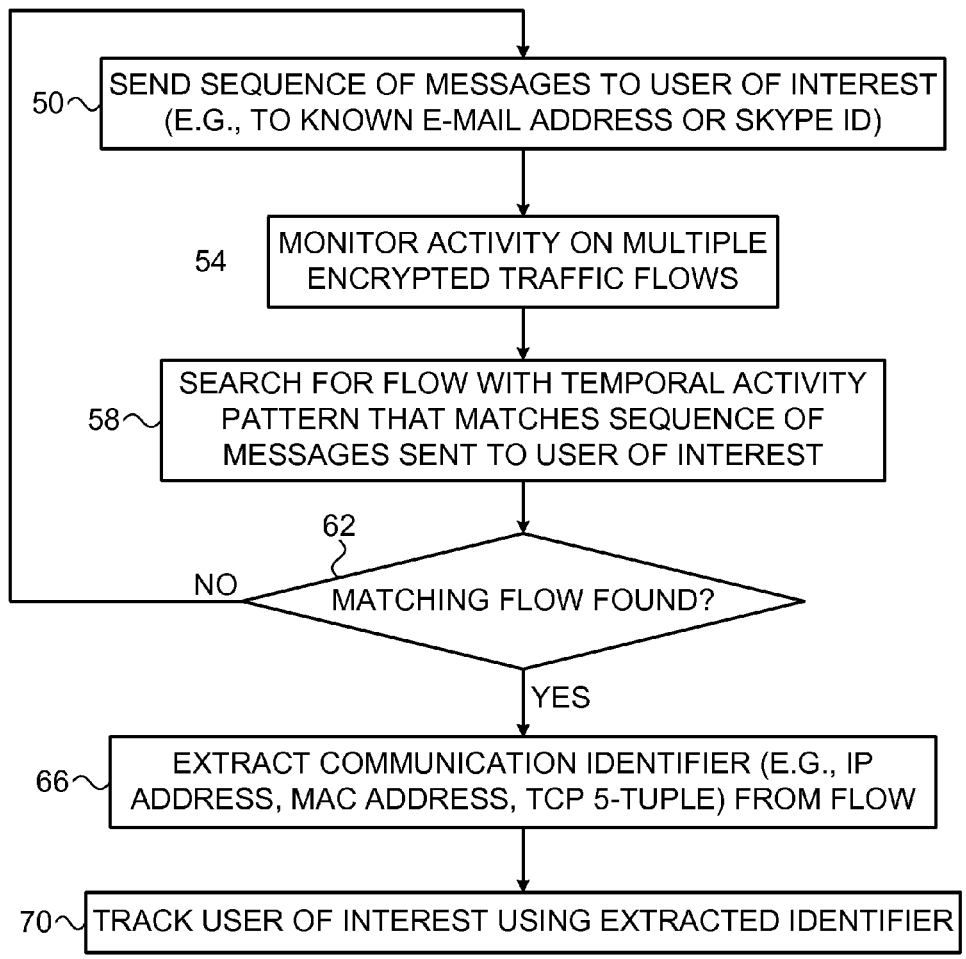
FIG. 2 is a flow chart that schematically illustrates a method for communication analysis, in accordance with an embodiment that is described herein.

FIG. 2 is a flow chart that schematically illustrates a method for communication analysis, in accordance with an embodiment that is described herein. The method begins with processor 40 of system 20 sending a sequence of messages to a network user of interest, at a sequence sending step 50.

Processor 40 monitors multiple traffic flows, at a monitoring step 54. Processor 40 searches the monitored flows for a flow whose temporal activity pattern matches the temporal pattern of the message sequence sent to the user, at a matching step 58. If no match is found, at a checking step 62, the method loops back to step 50, and system 20 continues the process of sending messages and searching for a matching flow.

If a matching flow is found, processor 40 extracts a communication identifier from the matching flow, at an identifier extraction step 66. The user is subsequently tracked using the extracted communication identifier, at a tracking step 70.

It will be appreciated that the embodiments described above are cited by way of example, and that the present disclosure is not limited to what has been particularly shown and described hereinabove. Rather, the scope of the present disclosure includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method, comprising:
monitoring, by a processor, multiple flows of communication traffic;
sending, by the processor, a sequence of layer-7 messages in accordance with a first temporal pattern to a layer-7 identifier of a user;
identifying, by the processor, among the monitored flows a flow whose activity has a second temporal pattern that matches the first temporal pattern; and
associating, by the processor, the identified flow with the user.

2. The method according to claim 1, wherein identifying the flow comprises predicting a third temporal pattern with which the sequence of the messages is expected to reach the user, and comparing the second and third temporal patterns.

3. The method according to claim 1, wherein the monitored flows are encrypted.

4. The method according to claim 1, wherein associating the identified flow with the user comprises extracting from the identified flow a communication identifier of a communication terminal operated by the user.

5. The method according to claim 4, and comprising tracking the user using the extracted communication identifier.

6. The method according to claim 1, wherein sending the messages comprises communicating with the user using a given communication application, and wherein monitoring the flows comprises choosing to monitor the flows of the given communication application.

7. The method according to claim 1, wherein sending the messages comprises configuring the messages such that the messages will not be presented to the user.

8. The method according to claim 1, wherein identifying the flow comprises matching traffic arrival times in the flow with respective traffic transmission times in the sequence of the messages.

9. The method according to claim 1, wherein identifying the flow comprises matching traffic volume as a function of time in the flow and in the sequence of the messages.

10. The method according to claim 1, wherein identifying the flow comprises progressively narrowing down a list of candidate flows that match the sequence of the messages, so as to converge to the identified flow.

11. An apparatus, comprising:
an interface for communicating over a communication network; and
a processor, which is configured to monitor multiple flows of communication traffic in the communication network, to send a sequence of layer-7 messages in accordance with a first temporal pattern to a layer-7 identifier of a user, to identify among the monitored flows a flow whose activity has a second temporal pattern that matches the first temporal pattern, and to associate the identified flow with the user.

12. The apparatus according to claim 11, wherein the processor is configured to identify the flow by predicting a third temporal pattern with which the sequence of the messages is expected to reach the user, and comparing the second and third temporal patterns.

13. The apparatus according to claim 11, wherein the monitored flows are encrypted.

14. The apparatus according to claim 11, wherein the processor is configured to extract from the identified flow a communication identifier of a communication terminal operated by the user.

15. The apparatus according to claim 14, wherein the processor is configured to track the user using the extracted communication identifier.

16. The apparatus according to claim 11, wherein the processor is configured to send the messages to the user using a given communication application, and to choose to monitor the flows of the given communication application.

17. The apparatus according to claim 11, wherein the processor is configured to configure the messages such that the messages will not be presented to the user.

18. The apparatus according to claim 11, wherein the processor is configured to identify the flow by matching traffic arrival times in the flow with respective traffic transmission times in the sequence of the messages.

19. The apparatus according to claim 11, wherein the processor is configured to identify the flow by matching traffic volume as a function of time in the flow and in the sequence of the messages.

20. The apparatus according to claim 11, wherein the processor is configured to progressively narrow down a list of candidate flows that match the sequence of the messages, so as to converge to the identified flow.

* * * * *